United States Patent
Reuss et al.

(10) Patent No.: US 9,751,426 B2
(45) Date of Patent: Sep. 5, 2017

(54) ACTIVATION METHOD FOR AN ELECTRIC MACHINE

(71) Applicant: Bayerische Motoren Werke Aktiengesellschaft, Munich (DE)

(72) Inventors: Joerg Reuss, Unterschleissheim (DE); Daniel Findeisen, Erding (DE); Michael Habermeier, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 27 days.

(21) Appl. No.: 14/874,119

(22) Filed: Oct. 2, 2015

(65) Prior Publication Data

US 2016/0023572 A1 Jan. 28, 2016

Related U.S. Application Data (63) Continuation of application No. PCT/EP2014/056419, filed on Mar. 31, 2014.

(30) Foreign Application Priority Data

Apr. 3, 2013 (DE) .......................... 10 2013 205 870

(51) Int. Cl.
*B60L 11/00* (2006.01)
*B60L 11/18* (2006.01)
(Continued)

(52) U.S. Cl.
CPC ............. *B60L 11/1868* (2013.01); *B60L 1/00* (2013.01); *B60L 11/1879* (2013.01);
(Continued)

(58) Field of Classification Search
CPC .... B60L 11/1868; B60L 1/00; B60L 11/1879; B60L 15/00; B60L 15/025; H02P 6/14;
(Continued)

(56) References Cited

U.S. PATENT DOCUMENTS 5,714,857 A * 2/1998 Mannel ................. H02P 25/024
318/432
5,811,957 A * 9/1998 Bose ....................... H02P 21/24
318/802
(Continued)

FOREIGN PATENT DOCUMENTS

DE 102 44 229 A1 4/2003
DE 10 2009 007 960 A1 8/2010
(Continued)

OTHER PUBLICATIONS

PCT/EP2014/056419, International Search Report dated Dec. 1, 2014 (Three (3) pages).
(Continued)

*Primary Examiner* — Rita Leykin
(74) *Attorney, Agent, or Firm* — Crowell & Moring LLP (57) ABSTRACT

A vehicle is configured with an N-phase electric machine, a first on-board electrical sub-system and a second on-board electrical sub-system. The electric machine includes a rotor and a stator system, wherein the first onboard electrical sub-system includes an inverter and the stator system is linked to the inverter. The electric machine can be operated using an inverter controller on the principle of a field-oriented control system, so that the electric machine is linked to a control unit, wherein the inverter can be controlled by the control unit, and the control unit uses a phased activation method to control the inverter.

14 Claims, 5 Drawing Sheets

(51) Int. Cl.
*B60L 15/00* (2006.01)
*B60L 15/02* (2006.01)
*B60L 1/00* (2006.01)
*H02P 6/14* (2016.01)

(52) U.S. Cl.
CPC ............ *B60L 15/00* (2013.01); *B60L 15/025* (2013.01); *H02P 6/14* (2013.01); *Y02T 10/643* (2013.01); *Y02T 10/7005* (2013.01); *Y02T 10/7066* (2013.01)

(58) Field of Classification Search
CPC ............ Y02T 10/643; Y02T 110/7005; Y02T 10/7006
USPC ....... 318/400.02, 400.36, 400.27; 307/10.01, 307/11, 18, 24, 43
See application file for complete search history.

(56) References Cited

U.S. PATENT DOCUMENTS

| | | | | |
|---|---|---|---|---|
| 6,198,256 B1 * | 3/2001 | Miyazaki | | B60K 6/26 |
| | | | | 290/40 C |
| 6,806,671 B2 | 10/2004 | Kusaka et al. | | |
| 7,129,677 B2 * | 10/2006 | Fu | | H02M 7/219 |
| | | | | 363/127 |
| 7,391,180 B2 | 6/2008 | Armiroli et al. | | |
| 7,659,686 B2 * | 2/2010 | Osada | | H02P 5/74 |
| | | | | 318/148 |
| 8,253,360 B2 * | 8/2012 | Schulz | | B60L 15/025 |
| | | | | 318/400.02 |
| 8,749,090 B2 | 6/2014 | Stancu et al. | | |
| 8,816,618 B2 * | 8/2014 | Fujii | | H02P 21/0003 |
| | | | | 318/400.01 |
| 8,983,727 B2 * | 3/2015 | Kifuku | | B62D 5/0493 |
| | | | | 318/437 |
| 9,106,176 B2 * | 8/2015 | Berringer | | H02P 21/06 |
| 2007/0132415 A1 * | 6/2007 | Patel | | H02P 25/03 |
| | | | | 318/432 |
| 2009/0134700 A1 | 5/2009 | Tanaka et al. | | |
| 2010/0320945 A1 | 12/2010 | Taniguchi et al. | | |
| 2014/0375232 A1 | 12/2014 | Findeisen et al. | | |

FOREIGN PATENT DOCUMENTS

| | | |
|---|---|---|
| DE | 10 2011 003 372 A1 | 8/2011 |
| DE | 10 2012 203 528 A1 | 9/2013 |
| EP | 1 286 459 A1 | 2/2003 |

OTHER PUBLICATIONS

German Search Report issued in counterpart German Application No. 10 2013 205 870.5 dated Nov. 25, 2013, with Statement of Relevancy (Five (5) pages).

* cited by examiner

ACTIVATION METHOD FOR AN ELECTRIC MACHINE

CROSS REFERENCE TO RELATED APPLICATIONS

This application is a continuation of PCT International Application No. PCT/EP2014/056419, filed Mar. 31, 2014, which claims priority under 35 U.S.C. §119 from German Patent Application No. 10 2013 205 870.5, filed Apr. 3, 2013, the entire disclosures of which are herein expressly incorporated by reference.

BACKGROUND AND SUMMARY OF THE INVENTION

The invention relates to a vehicle having an N-phase electric machine, a first on-board electric sub-system and a second on-board electric sub-system, wherein the electric machine comprises a rotor and a stator system, the first on-board electric sub-system comprises an inverter, the stator system is linked to the inverter and the electric machine can be operated using an inverter controller according to the principle of a field-oriented control system.

Components that are electric energy consumers are usually supplied with a rated voltage of 14 volts in a vehicle. A secondary 12 volt energy storage system, which assumes the function of an energy source or the function of an energy sink of any on-board electric system and a 14 volt generator are designed to supply an electric power of usually 1.5-3 kW in the vehicle.

If multiple consumers having an increased power demand are integrated into the on-board electric system of the vehicle, then the on-board electric system may have two or more on-board electric sub-systems. A DC chopper converter then transfers electric power between the two on-board electric sub-systems. The electric machine, which can also be operated as an engine in a vehicle having an electrified drive train, functions as an electric energy source or as an energy sink in the vehicle, in addition to at least one energy storage system per on-board electric sub-system. Such an on-board electric system topology is described in the publication DE 102 44 229 A1, for example.

One object of the invention is to describe an improved vehicle having an N-phase electric machine, a first on-board electric sub-system and a second on-board electric sub-system, wherein the electric machine comprises a rotor and a stator system, the first on-board electric sub-system comprises an inverter, the stator system is linked to the inverter and the electric machine can be operated with an inverter controller according to the principle of a field-oriented control system.

According to one embodiment of the invention, a control unit is linked to the electric machine, the inverter can be controlled by the control device and the control unit controls the inverter in the form of a phased activation method.

This means that the stator system of the electric machine is linked to the inverter and the electric machine can be operated with a current controller according to the principle of field-operated regulations, wherein a phased activation method which utilizes both the leakage inductance and the main inductance of the machine for smoothing the neutral point current is used.

In other words, this is a vehicle having an N-phase electric machine, a first on-board electric sub-system and at least one second on-board electric sub-system, wherein the electric machine comprises a rotor and a stator system, and the first on-board electric sub-system comprises an inverter for converting a DC voltage into an AC voltage. This may be a bridge circuit or some other topology such as a multi-level converter. At the input of this inverter, there is an intermediate circuit capacitor for smoothing the input voltage in the case of an applied voltage or an intermediate circuit choke for smoothing the input current in the case of an impressed current.

According to a preferred variant of the invention, it is advantageous if the stator system is embodied in a delta connection, if the neutral point can be connected to the second on-board electric sub-system directly or via a neutral point switch, if the inverter controller comprises a current controller and a neutral point controller, if the current controller regulates phase currents of the stator system and if the neutral point controller regulates a neutral point current.

It is expedient if the vehicle comprises measurement means for measuring a number of at least N−1 phase currents and the neutral point current, or if the vehicle has measurement means for measuring a number of at least N-phase currents or if the vehicle has measurement means for measuring an intermediate circuit current, wherein the measured intermediate circuit current enables at least one indirect determination of the N-phase currents of the machine on the basis of the voltage null pointers and the control unit comprises the inverter controller.

According to a preferred embodiment, the phased activation method smooths the neutral point current, wherein the neutral point current is smoothed by a leakage inductance and by a main inductance of the machine and a phased activation of the individual phases by a respective pulse pattern, and the pulse patterns are advantageously shifted by an angle of 360°/N.

According to another variant of the invention, the phased activation method serves to smooth the neutral point current by minimizing current ripples of the neutral point current, and the phase shift acts without torque in the rotor in regulation of the neutral point current, averaged over one revolution of the machine.

This means that, when averaged over one revolution of the machine, no additional torque is generated in the rotor.

Special advantages are obtained when the phased activation method can be used for an increased adjustment frequency in pulse pattern generation to reduce a switching frequency of the inverter to improve efficiency, or at a predetermined switching frequency to expand the operating range of a pulse width-modulated (PWM) regulation, which is limited by the rotational speed of the machine, in the direction of a higher rotational speed of the machine, and the neutral point controller supplies a control value for the activation method.

Thus, at a predetermined switching frequency, the PWM operating range, which is limited by the pole-changing frequency of the machine and thus by the rotational speed of the machine, can be shifted toward higher rotational speeds.

Another expedient embodiment of the invention is obtained when the measurement means are measuring N currents ($I_u$, $I_v$, $I_w$) of the electric machine, and the control unit transforms the measured currents ($I_u$, $I_v$, $I_w$) via an extended Clarke and Park transform into a field-oriented current indicator ($I_d$, $I_q$, $I_0$) with a flux-generating component ($I_d$), with a torque-forming component ($I_q$) and with a current zero component ($I_0$), wherein the neutral point current ($I_{neutral}$) is three times as much as the current zero component.

In addition, it is advantageous if the inverter controller has the flux-generating component as a regulating variable, if the inverter controller has the torque-forming component as regulating variable, if the inverter controller has the current zero component as a regulating variable, if the inverter controller has a first setpoint current variable ($I^*_d$) for the flux-generating component as a setpoint variable, if the inverter controller has a second setpoint current variable ($I^*_q$) for the torque-forming component as a setpoint variable, if the inverter controller has a neutral point setpoint current ($I^*_{neutral}$) as a setpoint variable, if the inverter controller outputs a first stator control voltage ($U^*_d$) as a control variable, if the inverter controller outputs a second stator control voltage ($U^*_q$) as a manipulated variable and if the inverter controller outputs a third stator control voltage ($U^*_0$) as a manipulated variable.

This is expediently supplemented by the fact that the N-phase electric machine is designed as a three-phase electric machine, the inverter comprises six inverter circuits (HS1, HS2, HS3, LS1, LS2, LS3), the six inverter circuits are arranged in three half bridges for the three phases of the stator system, the first stator control voltage, the second stator control voltage and the third stator control voltage can be transformed by an extended inverse Clarke and Park transform into phase voltages ($U_a$, $U_b$, $U_c$) of the stator system, and the inverter switches the phase voltage for each of the phases in a shift cycle according to the principle of pulse width modulation.

According to another variant of the invention, the electric machine transfers electric power from the first on-board electric sub-system to the second on-board electric sub-system when the neutral point switch closed and when a neutral point current ($I_{neutral}$) has a current direction from the neutral point to the second on-board electric sub-system and acts as a step-down converter.

In the case of a direct connection or a closed neutral point switch, the electric machine transfers electric power from the second on-board electric sub-system to the first on-board electric sub-system in the case of a neutral point current ($I_{neutral}$) having a current direction from the second on-board electric sub-system to the neutral point and acts as an step-up converter.

Furthermore, by stipulating the neutral point setpoint current and adjusting the neutral point control voltage, a neutral point current ($I_{neutral}$) can be adjusted and the electric machine acts as a bidirectional power controller when the neutral point switch is closed.

Preferred exemplary embodiments of the invention are described below on the basis of the accompanying drawings. These yield additional details, preferred embodiments and refinements of the invention. In detail they show schematically:

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
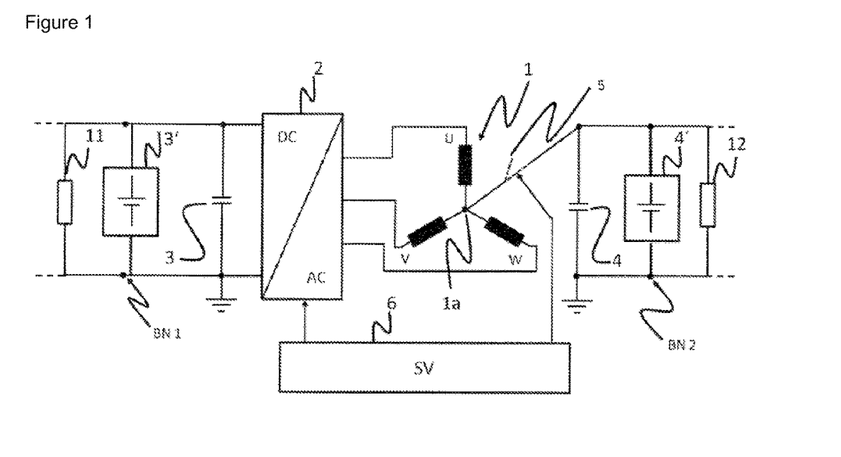
FIG. 1 illustrates a schematic topology of the an electric machine with a loaded neutral point.

The embodiment according to FIG. 1 shows as an example an N-phase machine as an electric machine designed as a three-phase machine having a rotor and a stator system (1). The three phases are designated as (u, v, w). The electric machine is linked to an inverter (2) and an intermediate circuit capacitor (3). The electric machine, the inverter and the intermediate circuit capacitor are components of a first on-board electric sub-system (BN1) of a vehicle. This on-board electric sub-system also has at least one first electric energy storage system (3'), which may be designed as an electrochemical energy storage system. The electric machine, which can be operated both as a generator and electrically, is activated via the inverter according to the principle of field-oriented regulation (FOR), which is known by those skilled in the art in this field. To do so, the inverter is preferably designed as a bridge converter, i.e., an electric half bridge of the inverter is linked to each phase of the electric machine. A half bridge consists of a series circuit of two switches, wherein the switch linked to the higher electric potential is designated as a high-side switch (HS1, HS2, HS3) and the switch linked to the lower electric potential is designated as a low-side switch (LS1, LS2, LS3).

A multi-level converter may also be used as an alternative to a bridge converter. Without restricting this generality, a bridge converter is also assumed.

The vehicle also has a second on-board electric sub-system (BN2), comprising, for example, a second electric energy storage system (4') with an optional intermediate circuit capacitor (4) and electric loads (12). The second on-board electric sub-system may have various embodiments. These have in common the fact that the lower potential of the second on-board electric sub-system corresponds to the lower potential of the first on-board electric sub-system. In particular there is no electric connection between the higher potential of the second on-board electric sub-system and to the higher potential of the first on-board electric sub-system.

However, the neutral point (1a) of the electric machine is permanently connected electrically to the higher potential of the second on-board electric sub-system or can be connected electrically via a switch which is referred to as a neutral point switch (5).

Due to this topology, a separate DC chopper converter may be eliminated and its function taken over by the combination of an N-phase electric machine with at least one winding in a delta connection, an inverter, optionally a bidirectional blocking switch between the neutral point of the machine and the higher potential of the second on-board electric sub-system, as well as an output capacitor for voltage smoothing. The prerequisite for determination of the neutral point current is that either all currents in the N phases or N–1 phases+neutral point current of the machine or the total current can be measured by the intermediate circuit capacitor. However, the latter option results in the restriction that a measurement is possible only if no voltage zero pointers are set, i.e., on the example of a bridge circuit either all the upper switches or all the lower switches are never closed simultaneously.

A suitable method for regulating the neutral point current is field-oriented control, for example, with use of the zero component from the extended Clarke and Park transform, which presupposes determination of the d/q current and the 0 current in the field-oriented coordinate system. The transformation equation can be given as follows:

$$\begin{bmatrix} I_d \\ I_q \\ I_0 \end{bmatrix} = \frac{2}{3} \cdot \begin{bmatrix} \cos(\beta_{el}) & \cos(\beta_{el}-120°) & \cos(\beta_{el}+120°) \\ -\sin(\beta_{el}) & -\sin(\beta_{el}-120°) & -\sin(\beta_{el}+120°) \\ \frac{1}{2} & \frac{1}{2} & \frac{1}{2} \end{bmatrix} \cdot \begin{bmatrix} I_U \\ I_V \\ I_W \end{bmatrix} \quad \text{(equation 1)}$$

In contrast with the normal Clarke and Park transform, it can be seen that the neutral point current here is not raised to 0 but instead represents an additional degree of freedom in the system. For the electric angle $\beta_{el}$ that is needed for rotation of the rotor-fixed coordinate system, it holds in general that $$\beta_{el} = \beta_{mech} \cdot Z_p + \beta_S$$

where $\beta_S$ represents the slip-dependent additional component in an asynchronous machine, which can be positive or negative, depending on motor operation or generator operation. This parameter is set at 0 in the case of a synchronous machine.

The actual value for the current $I_0$ determined in equation 1 can now be regulated at a defined setpoint value by means of a controller. Conventional types of controllers that can be used include both continuous controllers with optionally proportional and/or integral and/or differential component and state controllers or discontinuous controllers with two-point or three-point behavior, for example, or fuzzy controllers. For the sake of simplicity and conventional practice, a PI controller, which is usually implemented in digital form in a control unit in the prior art is assumed below.

The neutral point controller outputs a stator control voltage $U^*_0$ as a control value, which is sent to an extended, inverse Clarke and Park transform that can be represented as follows:

$$\begin{bmatrix} U^*_U \\ U^*_V \\ U^*_W \end{bmatrix} = \begin{bmatrix} \cos(\beta_{el}) & -\sin(\beta_{el}) & 1 \\ \cos(\beta_{el}-120°) & -\sin(\beta_{el}-120°) & 1 \\ \cos(\beta_{el}+120°) & -\sin(\beta_{el}+120°) & 1 \end{bmatrix} \cdot \begin{bmatrix} U^*_d \\ U^*_q \\ U^*_0 \end{bmatrix} \quad \text{(equation 2)}$$

Figure 3:
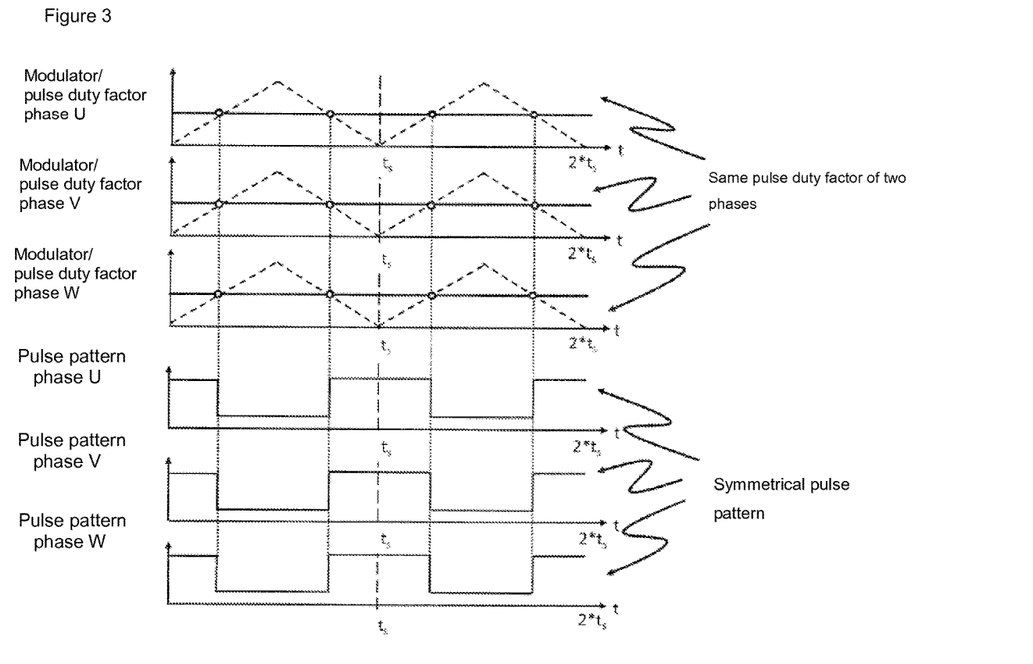
FIG. 3 illustrates a principle of symmetrical pulse pattern generation with a delta modulator.

The control voltages $U^*_U$, $U^*_V$ and $U^*_W$ thereby created can then be sent within the control unit to a PWM modulator, which generates pulse pattern signals from them for activating the inverter. Without further measures in the activation method, a symmetrical pulse pattern would be generated, as shown in FIG. 3, and thus the inverter would be operated so that the neutral point current is divided among all N phases of the machine in synchronization. This prevents the development of a main flux that could lead to a torque in the rotor in the machine, but it does not thereby also induce the main inductance of the machine, so that only the leakage inductance can be used for smoothing the neutral point current.

This is illustrated by the following derivation:
Derived from the general voltage equations for an electric machine in the stator-fixed UVW system:

$$\begin{bmatrix} U_U \\ U_V \\ U_W \end{bmatrix} = \frac{d}{dt}\underbrace{\begin{bmatrix} \Psi_u \\ \Psi_v \\ \Psi_w \end{bmatrix}}_{\Psi_{uvw}} + \begin{bmatrix} R_{s,uvw} & 0 & 0 \\ 0 & R_{s,uvw} & 0 \\ 0 & 0 & R_{s,uvw} \end{bmatrix} \cdot \underbrace{\begin{bmatrix} I_u \\ I_v \\ I_w \end{bmatrix}}_{I_{uvw}}$$

The interlinked magnetic flux can be described in general by a component that is active with the leakage inductance $L_{\sigma,uvw}$ and a component that is active with the main inductance $L_m$:

$$\Psi_{uvw} = L_{\sigma,uvw} \cdot \overline{E} \cdot \overline{I}_{uvw} + L_m \cdot \overline{M} \cdot \overline{I}_{uvw}$$

using the unit pointer $\overline{E}$ as well as the matrix $\overline{M}$, which represents the geometric arrangement of the phases relative to one another.

$$\overline{E} = \begin{bmatrix} 1 & 0 & 0 \\ 0 & 1 & 0 \\ 0 & 0 & 1 \end{bmatrix}, \overline{M} = \begin{bmatrix} \cos(0°) & \cos(120°) & \cos(240°) \\ \cos(240°) & \cos(0°) & \cos(120°) \\ \cos(120°) & \cos(240°) & \cos(0°) \end{bmatrix}$$

With the help of the extended Clarke and Park transform, the flux equation in the rotor-fixed d/q/0 coordinate system can be given in a general form as follows:

$$\Psi_{dq0} = \begin{bmatrix} \Psi_d \\ \Psi_q \\ \Psi_0 \end{bmatrix} = L_{\sigma,uvw} \cdot \overline{E} \cdot \begin{bmatrix} I_d \\ I_q \\ I_0 \end{bmatrix} + \begin{bmatrix} \frac{3}{2} \cdot L_m & 0 & 0 \\ 0 & \frac{3}{2} \cdot L_m & 0 \\ 0 & 0 & 0 \end{bmatrix} \cdot \begin{bmatrix} I_d \\ I_q \\ I_0 \end{bmatrix} \quad \text{(equation 3a)}$$

For machines having pronounced legs in the d and q axes, the corresponding inductances $L_d$ and $L_q$ can also be inserted into equation 3a.

$$\Psi_{dq0} = \begin{bmatrix} \Psi_d \\ \Psi_q \\ \Psi_0 \end{bmatrix} = L_{\sigma,uvw} \cdot \overline{E} \cdot \begin{bmatrix} I_d \\ I_q \\ I_0 \end{bmatrix} + \begin{bmatrix} L_d & 0 & 0 \\ 0 & L_q & 0 \\ 0 & 0 & 0 \end{bmatrix} \cdot \begin{bmatrix} I_d \\ I_q \\ I_0 \end{bmatrix} \quad \text{(equation 3b)}$$

It can be seen that the components of the main inductance $L_m$ do not act on the zero current $I_0$ but instead only the leakage inductance $L_{\sigma,uvw}$ is active for the current smoothing.

According to the general prior art the goal with an electric machine is for the leakage inductance to be kept as small as possible in favor of a good magnetic coupling between the stator and rotor so as a result this can lead to a very high current ripple in the neutral point current.

The following example illustrates this:
The zero current $I_0$ which is derived from the extended Clarke and Park transform is distributed essentially uniformly as 1/N each to the N phases of the electric machine:

$$I_0 = \frac{1}{3} \cdot I_U + \frac{1}{3} \cdot I_V + \frac{1}{3} \cdot I_W + \ldots$$

On the example of a three-phase machine this yields the following for the zero current:

$$I_0 = \tfrac{1}{3} \cdot [\hat{I}_u \cdot \sin(\omega t + 0°) + \hat{I}_v \cdot \sin(\omega t + 120°) + \hat{I}_w \cdot \sin(\omega t + 240°)]$$

Since the sum of the three sine currents offset by 120° each approaches zero, and there is the goal of the same amplitudes in all phases, the neutral point current can be described in simplified terms as:

$$I_{neutral} = 3 \cdot I_0.$$

If there is now an energy transfer from the on-board electric sub-system 1 to the on-board electric sub-system 2, then the current ripple for a step-down converter, which is known to those skilled in the art, can be given in a general form as follows:

$$\Delta I_0 = \frac{U_e - U_a}{L} \cdot D \cdot t_s$$

$$\Delta I_{neutral} = 3 \cdot \Delta I_0 = 3 \cdot \frac{U_e - U_a}{L_{\sigma,uvw}} \cdot D \cdot t_s$$

The pulse duty factor D for the step-down converter is defined as $U_a/U_e$ and the period $t_s$ corresponds to the inverse of the switching frequency $f_s$. If the on-board electric sub-system 1, for example, has a prevailing voltage of $U_e$=48 V and the on-board electric sub-system 2 has a prevailing voltage of $U_a$=12 V, the leakage inductance of the electric machine is on the order of magnitude of 20 µH, and the inverter is operated with a switch period of $t_s$=62.5 µs, this yields a current ripple as follows in the neutral point current:

$$\Delta I_{neutral} = 3 \cdot \frac{48\text{ V} - 12\text{ V}}{20\ \mu\text{Vs/A}} \cdot \frac{12\text{ V}}{48\text{ V}} \cdot 62{,}5\ \mu s \approx 84{,}4\text{ A}$$

For the case when, in the inverse case, there is to be an energy transfer from on-board electric sub-system 2 to on-board electric sub-system 1, the system is operated as an step-up converter, with which those skilled in the art are familiar. The current ripple with the step-up converter can be given as follows in general:

$$\Delta I_0 = \frac{U_e}{L} \cdot D \cdot t_s$$

The pulse duty factor of the step-up converter is defined as:

$$D = \frac{U_a - U_e}{U_a}$$

Since the same inductance is in effect here as in the case of the step-down converter operation, this also yields a current ripple as follows for the neutral point current, assuming the same boundary conditions as those with the step-down converter:

$$\Delta I_{neutral} = 3 \cdot \Delta I_0 = 3 \cdot \frac{U_e}{L_{\sigma,uvw}} \cdot \frac{U_a - U_e}{U_a} \cdot t_s$$

-continued $$\Delta I_{neutral} = 3 \cdot \frac{12\text{ V}}{20\ \mu\text{Vs/A}} \cdot \frac{48\text{ V} - 12\text{ V}}{48\text{ V}} \cdot 62{,}5\ \mu s = 84{,}4\text{ A}$$

A current ripple of this order of magnitude means that the output capacitor (12) must be designed with very large dimensions without any additionally applied external smoothing inductance.

The control voltage generated by the controllers in field-oriented form $U^*_d$, $U^*_q$, and $U^*_0$ are transformed into stator-fixed control voltages $U^*_U$, $U^*_V$ and $U^*_W$ either directly by means of an inverse Clarke and Park transform according to equation 2 and then sent to a PWM modulator or are first transformed by means of an inverse Clarke transform:

$$\begin{bmatrix} U^*_\alpha \\ U^*_\beta \\ U^*_0 \end{bmatrix} = \begin{bmatrix} 1 & 0 & 1 \\ -\tfrac{1}{2} & \tfrac{\sqrt{3}}{2} & 1 \\ -\tfrac{1}{2} & -\tfrac{\sqrt{3}}{2} & 1 \end{bmatrix} \cdot \begin{bmatrix} U^*_d \\ U^*_q \\ U^*_0 \end{bmatrix}$$

into stator flux-oriented components $U^*_\alpha$, $U^*_\beta$ and $U^*_0$, from which the corresponding pulse duty factors for the PWM modulator can be generated from these components for each phase of the electric machine by means of a space vector modulation known to those skilled in the art.

The pulse pattern for activating the inverter is then modified in such a manner that not only the leakage inductance but also the main inductance of the electric machine are utilized for smoothing the neutral point current.

A pulse pattern is plotted on the vertical axis as a function of the time t on the horizontal axis in FIGS. 2 through 6 which belong with this. The pulse pattern is obtained from the value of the pulse duty factor of the respective phase (also plotted on the vertical axis) in relation to the respective modulator signal (shown with dotted lines on the vertical axis). If the modulator signal assumes the value of the pulse duty factor or a local maximum, then essentially the pulse is switched to the respective phase, which results in a phase shift of the pulse pattern, for example, with different types of modulator for each phase (see FIG. 6). The pulse pattern is represented over the length of two periods $t_s$ in FIGS. 3 through 6.

The modification of the pulse pattern can take place for example by the fact that center aligned pulse pattern generation which is the customary method with an electric machine and with which those skilled in the art are familiar is used but the pulse duty factor, which is generated by the inverter controller is adjusted many times during a modulation period. It is advantageous here that the modulator can remain the same for all phases. The adjustment frequency can be increased by a factor of 2 during a modulation period, for example, in that the pulse duty factor for each phase output by the inverter controller is modified so as to yield two different values but on the average the same value is obtained over a modulation period, as if the pulse duty factor were adjusted only once per modulation period. This may be accomplished, for example, by implementing the current control with a double frequency, wherein all the Clarke and Park transforms must therefore also be carried out at double speed. In addition, the null pointers of the space vector modulation can also be distributed otherwise within a modulation period.

Figure 4:
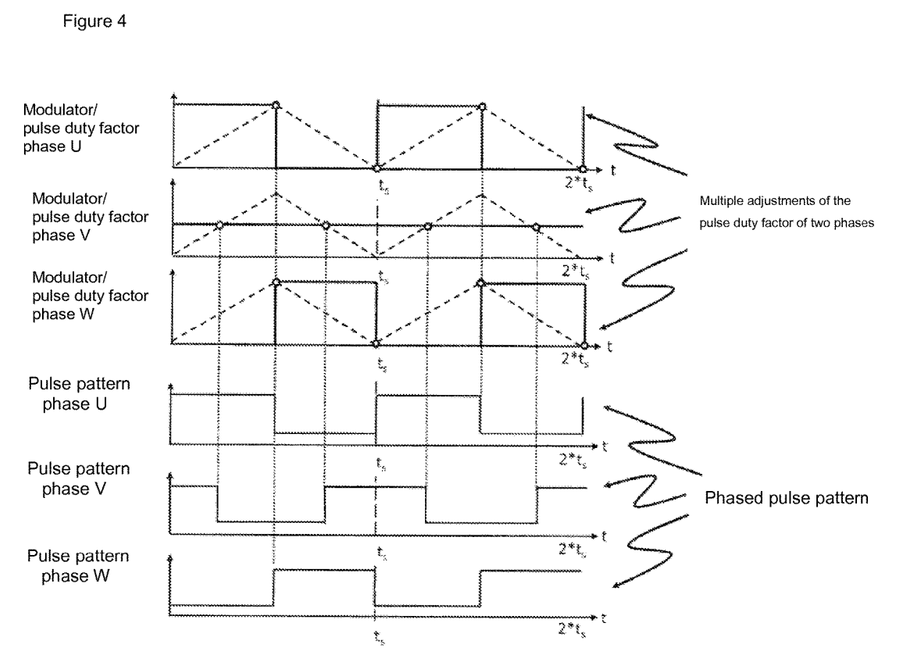
FIG. 4 illustrates a phase-shifted pulse pattern generation by multiple adjustment of the pulse duty factor during a delta modulation.

Another possibility is to store a pre-calculated pattern in the memory of the control unit and retrieve it as needed. FIG. 4 shows a corresponding embodiment.

Figure 5:
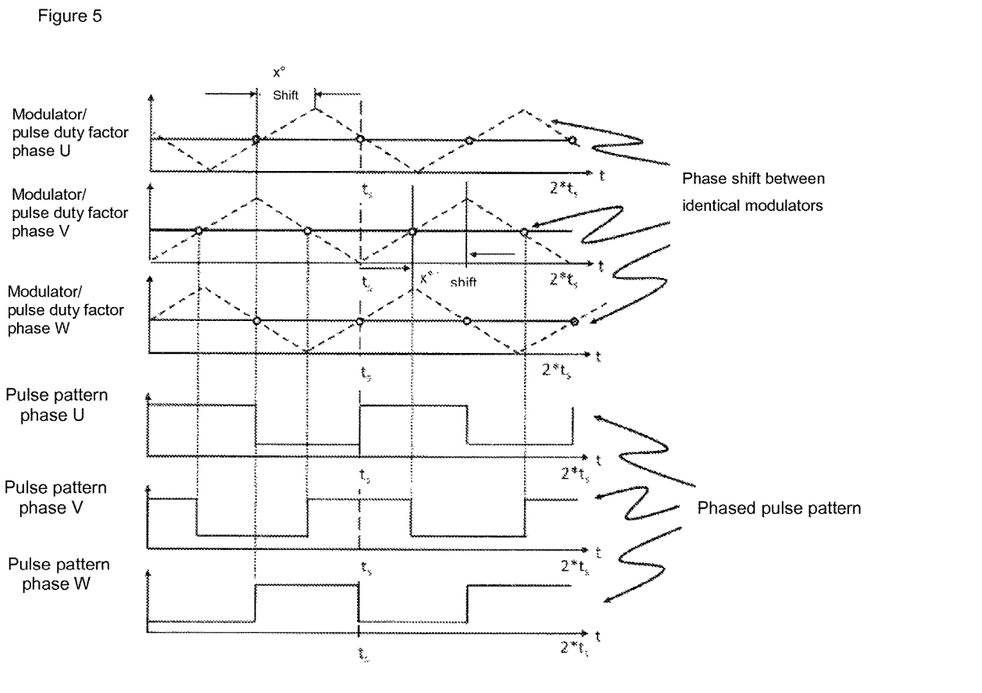
FIG. 5 illustrates a phase-shifted pulse pattern generation by a phase shift between modulators of the same type and a constant pulse duty factor.
Figure 6:
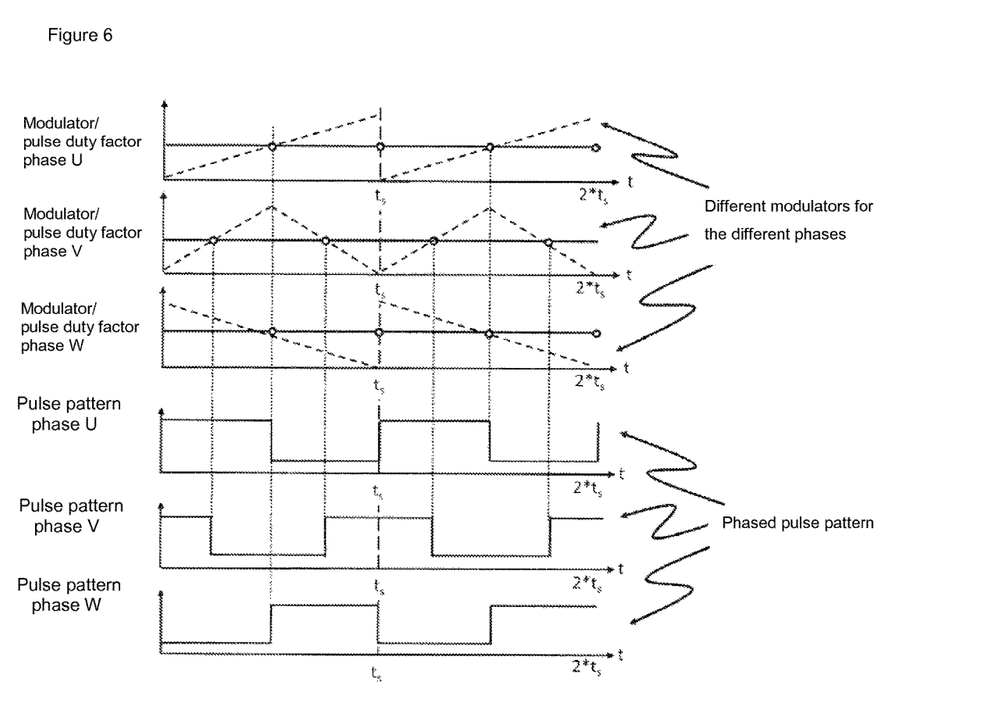
FIG. 6 illustrates a phase-shifted pulse pattern generation by different types of modulators at the same pulse duty factor for the various phases.

In addition, the pulse duty factor can also be kept constant over all phases, and different types of modulators, such as triangle or sawtooth, can each be used in ascending or descending form in combination (see FIG. 5). The two embodiments mentioned last are known to those skilled in the art as the edge aligned method. One last and most advantageous possibility for generating a phase-shifted pulse pattern is the use of the same types of modulators such as the triangle modulator and setting of a defined time offset between the individual phases (see FIG. 6). This constitutes the simplest type of implementation and offers the most degrees of freedom because, first of all, the phase shift between the individual modulators can be adjusted as needed during operation and, second, a simple adaptation to the phase number of the electric machine is possible, for example, by adjusting the phase shift to:

$$\text{Phase shift} = \frac{360°}{N \text{ phases}}.$$

Figure 2:
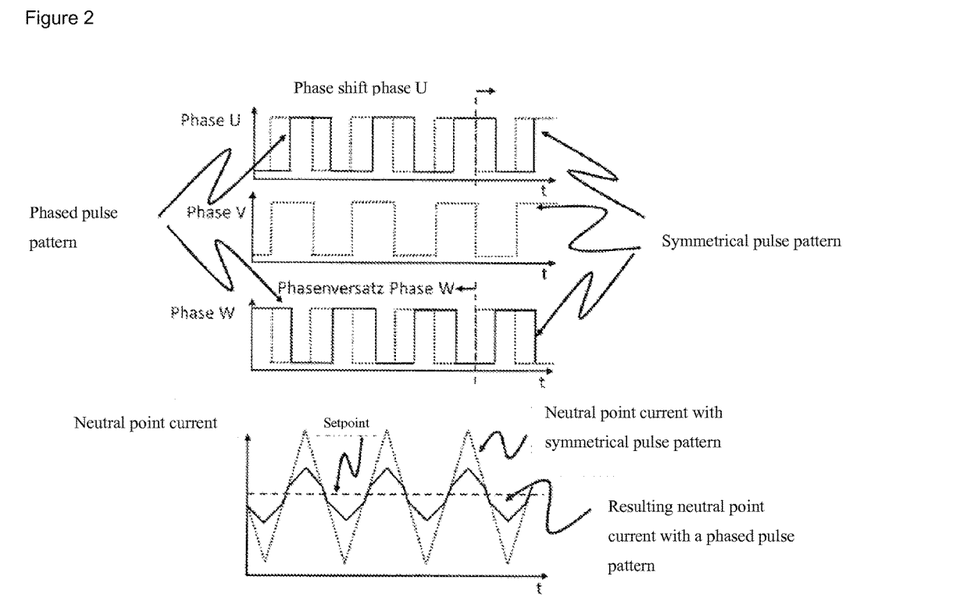
FIG. 2 illustrates an optimization of pulse pattern generation to reduce the current ripple of the neutral point current.

On the example of a three-phase machine, FIG. 2 shows how the current ripple in the neutral point current is reduced significantly by more than 50% by a shift in the pulse pattern of the phases U and W with no change in the pulse pattern of the phase V.

LIST OF REFERENCE NUMERALS

1 N-phase machine in delta connection
1a Neutral point
2 Inverter, e.g., bridge circuit or multi-level converter
3 Intermediate circuit capacitor for on-board electric sub-system 1, linked to the inverter
3' Energy storage system in the on-board electric sub-system 1
4 Energy storage system in the on-board electric sub-system 2
4' Intermediate circuit capacitor for on-board electric sub-system 1
5 Switch for connecting the neutral point to the higher potential of the on-board electric sub-system 2 (optional)
6 Control device (SV)
11 Load in the on-board electric sub-system 1
12 Load in the on-board electric sub-system 2

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle having an N-phase electric machine, a first on-board electric sub-system, and a second on-board electric sub-system, wherein the electric machine comprises a rotor and a stator system, the first on-board electric sub-system comprises an inverter, the stator system is linked to the inverter and the electric machine can be operated with an inverter controller according to the principle of a field-oriented regulation, wherein a control unit is linked to the electric machine,
the inverter can be controlled by the control unit, and
the control unit controls the inverter in the form of a phase shifted activation method,
wherein the phase shifted activation method smooths a neutral point current, wherein the neutral point current is smoothed by a leakage induction and by a main inductance of the machine.

2. The vehicle according to claim 1, wherein
the stator system is embodied in a star connection,
a neutral point can be connected to the second on-board electric sub-system directly or via a neutral point switch,
the inverter controller comprises a current controller and a neutral point controller,
the current controller regulates phase currents of the stator system, and
the neutral point controller regulates a neutral point current.

3. The vehicle according to claim 1, wherein
the vehicle comprises measurement means for measuring a number of at least N−1 phase currents and a neutral point current, and
the control unit comprises the inverter controller.

4. The vehicle according to claim 1, wherein
the vehicle comprises measurement means for measuring a number of at least N-phase currents, and
the control unit comprises the inverter controller.

5. The vehicle according to claim 1, wherein
the vehicle comprises a measurement means for measuring an intermediate circuit current, wherein the measured intermediate circuit current enables at least one indirect determination of an N-phase current of the electric machine on the basis of voltage zero pointers, and
the control unit comprises the inverter controller.

6. The vehicle according to claim 1, wherein
a time offset between each individual phase of the electric machine is adjustable.

7. The vehicle according to claim 1, wherein
the phase shifted activation of individual phases of the electric machine takes place through a respective pulse pattern, and
the pulse patterns are shifted by an angle of 360°/N, wherein N is a number of individual phases of the electric machine.

8. The vehicle according to claim 1, wherein
a measurement means measuring N currents of the electric machine, and
the control unit converts the measured N currents via an extended Clarke and Park transform to a field-oriented current vector with a flux-generating component, with a torque-forming component and with a current zero component, wherein a neutral point current amounts to three times the current zero component.

9. The vehicle according to claim 1, wherein
the inverter controller has a flux-generating component as a control variable,
the inverter controller has a torque-forming component as a control variable,
the inverter controller has a current zero component as a control variable,
the inverter controller has a first setpoint current for the flux-generating component as a setpoint variable,
the inverter controller has a second setpoint current for the torque-forming component as a setpoint variable,
the inverter controller has a neutral point setpoint current as a setpoint variable, the inverter controller outputs a first stator control voltage, the inverter controller outputs a second stator control voltage, and the inverter controller outputs a third stator control voltage.

10. The vehicle according to claim 1, wherein the N-phase electrical machine is designed as a three-phase electric machine, the inverter comprises six inverter switches, the six inverter switches are arranged in three half bridges for the three phases of the stator system, a first stator control voltage, a second stator control voltage and a third stator control voltage can be converted into phase voltages of the stator system by an extended inverse Clarke and Park transform, and the inverter, via the six inverter switches, switches the phase voltages for each of the three phases in a switch cycle according to the principle of pulse width modulation.

11. The vehicle according to claim 1, wherein, in the case of a direct connection or a closed neutral point switch, the electric machine transfers electric power from the second on-board electric sub-system to the first on-board electric sub-system, with a current direction from the second on-board electric sub-system to the first on-board electric sub-system, and acts as an step-up converter.

12. The vehicle according to claim 1, wherein by stipulating a neutral point setpoint current and an adjustment of a neutral point setpoint voltage, a neutral point current is adjustable, and the electric machine acts as a bidirectional power controller when a neutral point switch is turned off.

13. A vehicle having an N-phase electric machine, a first on-board electric sub-system, and a second on-board electric sub-system, wherein the electric machine comprises a rotor and a stator system, the first on-board electric sub-system comprises an inverter, the stator system is linked to the inverter and the electric machine can be operated with an inverter controller according to the principle of a field-oriented regulation, wherein a control unit is linked to the electric machine, the inverter can be controlled by the control unit, the control unit controls the inverter in the form of a phase shifted activation method, the phase shifted activation method can be utilized for an increased adjustment frequency in pulse pattern generation to reduce a switching frequency of the inverter to improve its efficiency or to expand the operating range of a pulse width-modulated control, which is limited by a rotational speed of the machine at a predefined switching frequency, in a direction of a higher rotational speed of the machine, and a neutral point controller supplies a control value for the activation method.

14. A vehicle having an N-phase electric machine, a first on-board electric sub-system, and a second on-board electric sub-system, wherein the electric machine comprises a rotor and a stator system, the first on-board electric sub-system comprises an inverter, the stator system is linked to the inverter and the electric machine can be operated with an inverter controller according to the principle of a field-oriented regulation, wherein a control unit is linked to the electric machine, the inverter can be controlled by the control unit, the control unit controls the inverter in the form of a phase shifted activation method, and with a neutral point switch closed, the electric machine transfers electric power from the first on-board electric sub-system to the second on-board electric sub-system in a neutral point current, with a current direction from the neutral point to the second on-board electric sub-system, and acts as a step-down converter.

* * * * *